United States Patent
Nikhara et al.

(10) Patent No.: US 9,860,507 B2
(45) Date of Patent: Jan. 2, 2018

(54) DYNAMIC FRAME SKIP FOR AUTO WHITE BALANCE

(71) Applicant: QUALCOMM Incorporated, San Diego, CA (US)

(72) Inventors: Soman Nikhara, Hyderabad (IN); Vignesh Bhuvaneshwar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/174,892

(22) Filed: Jun. 6, 2016

(65) Prior Publication Data

US 2016/0360176 A1    Dec. 8, 2016

(30) Foreign Application Priority Data

Jun. 8, 2015  (IN) ............................ 1703/DEL/2015

(51) Int. Cl.
*H04N 9/73*      (2006.01)
*H04N 1/60*      (2006.01)
*H04N 9/04*      (2006.01)

(52) U.S. Cl.
CPC ........... *H04N 9/735* (2013.01); *H04N 1/6077* (2013.01); *H04N 9/045* (2013.01)

(58) Field of Classification Search
None
See application file for complete search history.

(56) References Cited

U.S. PATENT DOCUMENTS

| | | |
|---|---|---|
| 2004/0090537 A1 | 5/2004 | Kubo |
| 2004/0109071 A1* | 6/2004 | Kido .................... H04N 3/1562 348/231.2 |
| 2004/0174441 A1 | 9/2004 | Castorina et al. |
| 2007/0091184 A1 | 4/2007 | Wang |
| 2007/0147701 A1 | 6/2007 | Tanaka |
| 2007/0159536 A1* | 7/2007 | Lin .......................... H04N 9/73 348/223.1 |
| 2008/0043133 A1 | 2/2008 | Sasaki et al. |
| 2008/0266417 A1 | 10/2008 | Abe |
| 2010/0033595 A1* | 2/2010 | Ajito ..................... H04N 9/735 348/223.1 |

(Continued)

FOREIGN PATENT DOCUMENTS

| | | |
|---|---|---|
| JP | 2005244870 A | 9/2005 |
| WO | WO-2016059423 A1 | 4/2016 |

OTHER PUBLICATIONS

International Search Report and Written Opinion—PCT/US2016/036237—ISA/EPO—dated Aug. 29, 2016.

(Continued)

*Primary Examiner* — Justin P Misleh
(74) *Attorney, Agent, or Firm* — Knobbe, Martens, Olson & Bear, LLP

(57) ABSTRACT

Certain aspects relate to systems and techniques for dynamically configuring frame skip for AWB calculations. For example, if RGB gains are deemed to be stable across a number of frames, the frame skip value used for AWB calculations can be increased. Changing RGB gains are indicators of image changes such as a changing scene and/or changing illuminant, which can indicate a need for updated AWB calculations, and accordingly the frame skip value can be set to zero or a low number of frames.

30 Claims, 9 Drawing Sheets

(56) References Cited

U.S. PATENT DOCUMENTS

| | | |
|---|---|---|
| 2010/0157160 A1 | 6/2010 | Tang |
| 2010/0225779 A1 | 9/2010 | Muukki |
| 2012/0050563 A1 | 3/2012 | Cote et al. |
| 2012/0189263 A1* | 7/2012 | Kato ................ H04N 5/23245 |
| | | 386/227 |
| 2013/0329995 A1 | 12/2013 | Webb et al. |
| 2015/0222799 A1* | 8/2015 | Noorkami ............ H04N 5/2352 |
| | | 348/223.1 |

OTHER PUBLICATIONS

Kim S., et al., "Automatic White Balance Based on Adaptive Feature Selection with Standard Illuminants", IEEE International Conference on Image Processing, Oct. 2008, pp. 485-488.

* cited by examiner

DYNAMIC FRAME SKIP FOR AUTO WHITE BALANCE

CROSS-REFERENCE TO RELATED APPLICATION(S)

The present application claims priority to Indian Provisional Patent Application No. 1703/DEL/2015, filed on Jun. 8, 2015, entitled "DYNAMIC FRAME SKIP FOR AUTO WHITE BALANCE," the contents of which is hereby incorporated by reference herein in its entirety and for all purposes.

TECHNICAL FIELD

The systems and methods disclosed herein are directed to automatic white balance in digital imaging, and, more particularly, to dynamically configuring frame skip in automatic white balance.

BACKGROUND

White balance involves the process of removing unrealistic color casts from images so that objects which appear white in person are rendered white in the image. Improper white balance can create unsightly blue, orange, or even green color casts. Proper white balance takes into account the color temperature of a light source, which refers to the relative warmth or coolness of the light—light sources, also referred to as illuminants herein, may not be pure white, but instead have a bias towards a particular color. Human perception is able to compensate for illumination that is not pure white, so colors appear relatively consistent over a wide range of lighting conditions.

Cameras, however, may perceive the same scene differently when the illuminant changes. A typical sensor used in an electronic image capture device, such as a digital camera or video recorder, may capture an image that exhibits a color shift attributable to illumination from a non-pure white source. The color shift exhibited in the captured image may appear unnatural to the human eye and create a perception that the sensor or capture device is of low quality due to being unable to accurately capture real world images.

Cameras perform automatic white balance (AWB) to attempt to determine what objects are white when illuminated by light sources of different color temperatures. A captured image may be processed to compensate for lighting conditions and color temperature of the illuminant. White balance compensation depends on the color temperature of the illuminant. White balance compensation configured for an illuminant at a first color temperature may not correct for color temperature of a second illuminant, and may further degrade image quality by introducing additional color shift into the image. When color tone in a digital image is off, for example due to no white balancing or incorrect white balancing, human perception of the image may be objectionable.

SUMMARY

The systems, methods and devices of this disclosure each have several innovative aspects, no single one of which is solely responsible for the desirable attributes disclosed herein.

In general, this disclosure is related to dynamically configuring frame skip in automatic white balance. Some digital cameras feature automatic white balance (AWB) whereby the camera analyzes the overall color of an image and calculates the best-fit white balance. To illustrate, a camera may capture frames (also referred to herein as statistics frames) at a frame rate of 30 fps. These frames, also referred to as statistics frames, may be used to generate data for performing AWB calculations as well as other image processing operations, for instance auto focus and auto exposure control. AWB calculations are typically performed on every alternate statistics frame. As such, the AWB algorithm can be computationally intensive, causing high central processing unit (CPU) and/or image processor usage and leading to high usage of device power, which can be particularly undesirable in portable devices using stored power.

These problems, among others, are addressed in some embodiments by the dynamic frame skipping techniques described herein. In some embodiments, AWB calculations output RGB gains that can be used to dynamically compute frame skip, thereby reducing power costs of AWB without negatively impacting image quality. Stable scenes can have RGB gains that are almost unchanged, hence the frame skip can be increased once the scene is determined to have stabilized. Frame skip can be reduced when the scene is identified as having changed. For example, if RGB gains are deemed to be stable across a number of frames, the frame skip value (that is, the number of frames skipped between performing AWB calculations) can be increased. Changing RGB gains are indicators of image changes such as a changing scene and/or changing illuminant, which can indicate a need for updated AWB calculations, and accordingly the frame skip value can be set to zero or a low number of frames. Such dynamic computation of frame skip values in AWB calculations can help to reduce CPU usage once AWB output is stable.

Accordingly, one aspect relates to a method for performing dynamically configuring frame skip for performing auto white balance, the method comprising receiving image data comprising at least a current frame and a previous frame; calculating a difference in RGB values between the current frame and the previous frame; and determining, based at least partly on the difference in RGB values, a number of frames to skip between performing AWB calculations.

Another aspect relates to an image capture system comprising an image sensor having an array of photosensitive elements each located at one of a plurality of locations on the image sensor; and at least one processor configured to receive image data having red, green and blue channels, the image data representing at least a current frame and a previous frame, the current frame comprising a first plurality of pixels and the previous frame comprising a second plurality of pixels; calculate RGB gain information for each of the red, green and blue channels, and from pixel values corresponding to each of at least a subset of the plurality of locations of the photosensitive elements, based on identifying a first value from one of the first plurality of pixels, and identifying a second value from a corresponding one of the second plurality of pixels; and calculating a change between the first value and the second value; determine, based on the RGB gain information, a maximum change value representing a greatest difference between the first value and the second value for at least one of the subset of the plurality of locations; compare the maximum change value with at least one threshold; and determine, based at least partly on a result of comparing the maximum change value with the at least one threshold, a number of frames to skip between performing AWB calculations.

In some embodiments, the at least one processor can be further configured to compare the maximum change value with at least one threshold based on comparing the maximum change value with a first threshold; and in response to determining that the maximum change value is less than or equal to the first threshold, setting the number of frames to skip between performing AWB calculations to a maximum frame skip value. The maximum frame skip value can be ten frames. The first threshold can be one percent, and the maximum change value can represent a percentage difference between the first value and the second value for the at least one of the subset of the plurality of locations. In response to determining that the maximum change value is greater than the first threshold, the at least one processor can be further configured to compare the maximum change value with a second threshold; and n response to determining that the maximum change value is less than or equal to the second threshold, set the number of frames to skip between performing AWB calculations to an intermediate frame skip value, wherein the intermediate frame skip value is less than the maximum frame skip value. In response to determining that the maximum change value is greater than the second threshold, the at least one processor can be further configured to set the number of frames to skip between performing AWB calculations to a minimum frame skip value, wherein the minimum frame skip value is less than the intermediate frame skip value. The second threshold can be three percent, and the maximum change value can represent a percentage difference between the first value and the second value for the at least one of the subset of the plurality of locations. The minimum frame skip value can be zero.

In some embodiments, the at least one processor can be further configured to receive additional image data representing a plurality of additional frames; perform AWB calculations on a first additional frame of the plurality of additional frames; skip performing AWB calculations on subset of the plurality of additional frames, wherein a number of frames in the plurality of additional frames is equal to the determined number of frames; and perform AWB calculations on a second additional frame of the plurality of frames, wherein the subset of the plurality of additional frames were captured temporally between the first and second additional frames. The at least one processor can be further configured to calculate an updated number of frames to skip between performing AWB calculations based on at least some of the plurality of additional frames. The at least one processor can be further configured to perform AWB calculations on an additional plurality of additional frames based on the updated number of frames to skip.

Some embodiments can further comprise a color filter array positioned between the image sensor and incoming light from a target image scene, the color filter array comprising a plurality of band pass filters each corresponding to one of the red, green, and blue channels.

Another aspect relates to a method for dynamically configuring a frame skip value for performing auto white balance, the method comprising receiving, from an image sensor comprising an array of photosensitive elements each located at one of a plurality of locations on the image sensor, image data representing at least a current frame and a previous frame, the current frame comprising a first plurality of pixels and the previous frame comprising a second plurality of pixels; identifying, for at least one color channel, and from pixel values corresponding to each of at least a subset of the plurality of locations of the photosensitive elements, a first value from one of the first plurality of pixels and a second value from a corresponding one of the second plurality of pixels; calculating a change value between the first value of the one of the first plurality of pixels from the first frame and the second value of the corresponding one of the second plurality of pixels of the second frame; comparing the change value with at least one threshold; and determining, based at least partly on a result of comparing the change value with the at least one threshold, a number of frames to skip between performing AWB calculations.

In some embodiments, comparing the change value with at least one threshold comprises comparing the change value with a first threshold; and in response to determining that the change value is less than or equal to the first threshold, setting the number of frames to skip between performing AWB calculations to a maximum frame skip value. The method can further comprise, in response to determining that the change value is greater than the first threshold comparing the change value with a second threshold; and in response to determining that the change value is less than or equal to the second threshold, setting the number of frames to skip between performing AWB calculations to an intermediate frame skip value, wherein the intermediate frame skip value is less than the maximum frame skip value. The method can further comprise, in response to determining that the change value is greater than the second threshold, setting the number of frames to skip between performing AWB calculations to a minimum frame skip value, wherein the minimum frame skip value is less than the intermediate frame skip value.

Calculating the change value can comprise computing a maximum change of R, G, and B gains between the current frame and the previous frame. Calculating the change value can comprise comparing the maximum change of R, G, and B gains to a history average of R, G, and B gains between pairs of a plurality of previous frames. The method can further comprise, in response to determining that the maximum change of R, G, and B gains is greater than the history average of R, G, and B gains, outputting the maximum change of R, G, and B gains as the change value; and in response to determining that the maximum change of R, G, and B gains is less than the history average of R, G, and B gains, outputting the history average of R, G, and B gains as the change value.

Some embodiments of the method can further comprise receiving additional image data representing a plurality of additional frames; performing AWB calculations on a first additional frame of the plurality of additional frames; skipping performing AWB calculations on subset of the plurality of additional frames, wherein a number of frames in the plurality of additional frames is equal to the determined number of frames; and performing AWB calculations on a second additional frame of the plurality of frames, wherein the subset of the plurality of additional frames were captured temporally between the first and second additional frames.

Another aspect relates to a non-transitory computer-readable medium having stored thereon instructions that, when executed, cause at least one processor of a device to receive image data representing at least a current frame and a previous frame, the current frame comprising a first plurality of pixels and the previous frame comprising a second plurality of pixels, each of the first and second plurality of pixels having a value associated with at least one channel; calculate, based on the value of at least a subset of the first plurality of pixels and a corresponding subset of the second plurality of pixels, a gain value associated with the at least one channel; compare the gain value with at least one threshold; and determine, based at least partly on a result of comparing the gain value with the at least one threshold, a number of frames to skip between performing AWB calculations.

In some embodiments, the non-transitory computer-readable medium can further have stored thereon instructions that, when executed, cause the at least one processor to compare the gain value with a first threshold; and in response to determining that the gain value is less than or equal to the first threshold, set the number of frames to skip between performing AWB calculations to a maximum frame skip value. The non-transitory computer-readable medium can further have stored thereon instructions that, when executed, cause the at least one processor to, in response to determining that the gain value is greater than the first threshold compare the gain value with a second threshold; and in response to determining that the gain value is less than or equal to the second threshold, set the number of frames to skip between performing AWB calculations to an intermediate frame skip value, wherein the intermediate frame skip value is less than the maximum frame skip value. The non-transitory computer-readable medium can further have stored thereon instructions that, when executed, cause the at least one processor to, in response to determining that the gain value is greater than the second threshold, set the number of frames to skip between performing AWB calculations to a minimum frame skip value, wherein the minimum frame skip value is less than the intermediate frame skip value. Calculating the gain value can comprise computing a maximum change of R, G, and B gains between the current frame and the previous frame.

Some embodiments of the non-transitory computer-readable medium can further have stored thereon instructions that, when executed, cause the at least one processor to receive additional image data representing a plurality of additional frames; perform AWB calculations on a first additional frame of the plurality of additional frames; skip performing AWB calculations on subset of the plurality of additional frames, wherein a number of frames in the plurality of additional frames is equal to the determined number of frames; and perform AWB calculations on a second additional frame of the plurality of frames, wherein the subset of the plurality of additional frames were captured temporally between the first and second additional frames.

Another aspect relates to an image capture apparatus comprising means for sensing incident light and outputting image data representing the incident light; means for identifying channel data of a first frame and a second frame of the image data; means for calculating a channel gain value based on the channel data of the first frame and the second frame; means for comparing the channel gain value with at least one threshold; and means for determining, based at least partly on a result of comparing the channel gain value with the at least one threshold, a number of frames to skip between performing AWB calculations.

In some embodiments of the apparatus, the means for determining the number of frames to skip can comprise means for setting the number of frames to a high skip value if the channel gain value is less than the at least one threshold and to set the number of frames to a low skip value if the channel gain value is greater than the at least one threshold. The apparatus can further comprise means for performing AWB calculations based partly on the determined number of frames. The apparatus can further comprise means for color filtering, the color filtering means positioned between the sensing means and a target image scene, the color filter means and sensing means cooperating to produce the channel data.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

Introduction

Figure 1A:
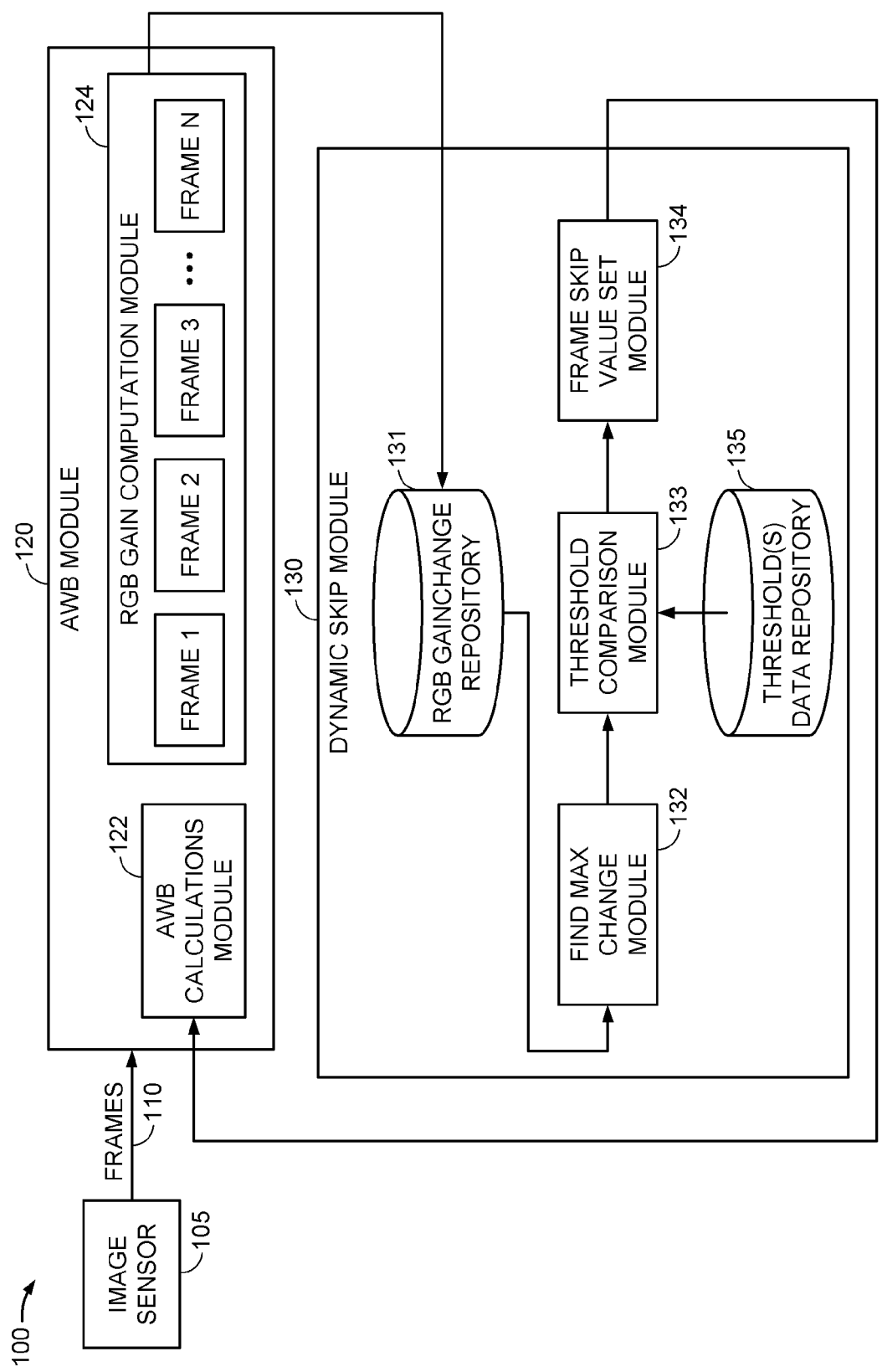
FIG. 1A provides an illustrative example of one embodiment of dynamic frame skipping.

Embodiments of the disclosure relate to systems and techniques for dynamically computing a number of frames to skip between AWB calculations. In some embodiments, RGB gains (a difference in R, G, and B values between successively captured frames) can be used to dynamically compute frame skip, thereby reducing power costs of AWB without negatively impacting image quality. For example, if RGB gains are deemed to be stable across a number of frames, the frame skip value can be increased, while the frame skip value can be set to zero or a low number of frames in response to changing RGB gains. Such dynamic computation of frame skip values in AWB calculations can help to reduce processing and power usage once AWB output is stable. Some implementations of AWB calculation using such dynamic frame skip techniques can achieve around a 30%-40% CPU utilization reduction when compared to existing AWB techniques.

To illustrate, some embodiments may compute the RGB gain between successive frames within a predetermined window of frames, for example ten frames, where the RGB gain values represent a percentage change in RGB values between successive frames. A maximum value in RGB gains between a current frame and previous frame can be stored in an RGB gains history, and the stored values can be averaged. A largest RGB gains value can be identified between the maximum RGB gain value of the current frame and the average of the history values. This largest value can be compared to one or more thresholds to determine a value for frame skip, that is, to determine how many frames to skip between AWB calculations.

In one example, if the largest value is less than a high skip threshold, then the AWB calculations can be performed at a high frame skip rate. If the largest value is greater than the high skip threshold, the largest value can then be compared to a low skip threshold. If the largest value is less than the low skip threshold, then the AWB calculations can be performed at a low frame skip rate. If the largest value is greater than the low skip threshold, then the AWB calculations can be performed with no or minimal frame skipping.

In some embodiments the high skip threshold can be set to 1% and the low skip threshold can be set to 3%, where the RGB gain values represent a percentage change in RGB values between successive frames. These thresholds can be configurable based on a desired tradeoff between image quality and power consumption. These thresholds can be set during calibration of image capture devices in some embodiments. In other embodiments, a user of an image capture device may be able to configure the settings based on a desired balance between image quality and power usage. In other embodiments, the thresholds can be dynamically modified, for example based on remaining battery power of the image capture device and/or available processing resources of the image capture device.

In other embodiments greater than two thresholds can be used, each with an associated frame skip value should the largest value be less than the threshold, where the largest value would be compared to the smallest threshold first and the largest threshold last. Other frame skip value setting changes are also possible, for example where comparison of an RGB gains value to one or more thresholds results in adding to or subtracting from a current frame skip value up to a maximum frame skip value.

In other embodiments the window can be set to greater or fewer than ten frames. In some implementations the window may be a sliding window, such that as image capture continues old frames drop out of the window and new frames enter the window for usage in the frame skip computations. The data stored in the RGB gains history can be updated accordingly.

As used herein, "successive frames" refers to adjacent frames in a queue for consideration for the dynamic frame skip computation techniques described herein. The successive frames may have been captured one after another by an associated image sensor, though in when the frame skip value is nonzero there may be time lapse between successive frames, for example ten or more frames.

Alternate embodiments can compute the correlation between input statistics of current and previous frames, and perform AWB calculations only if the correlation percentage is smaller than a configurable threshold. Some embodiments can combine this correlation approach with the dynamic frame skip techniques.

Although discussed primarily in the context of AWB calculations, the frame skip techniques described herein can be useful for reducing processing utilization of other image processing techniques, for example auto exposure and auto focus.

Various embodiments will be described below in conjunction with the drawings for purposes of illustration. It should be appreciated that many other implementations of the disclosed concepts are possible, and various advantages can be achieved with the disclosed implementations. Headings are included herein for reference and to aid in locating various sections. These headings are not intended to limit the scope of the concepts described with respect thereto. Such concepts may have applicability throughout the entire specification.

Overview of Dynamic Frame Skip for Automatic White Balance

FIG. 1A provides an illustrative example of one embodiment of a dynamic frame skip system 100 for adaptively computing a number of frames to skip between AWB calculations. The dynamic frame skip system 100 can include an AWB module 120 and a dynamic skip module 130. Although shown as separate from the AWB module 120, the dynamic skip module 130 can be a sub-module of an AWB module 120 in other implementations.

Frames 110 read out from an image sensor 105 are input into the AWB module 120. Some embodiments of the dynamic frame skip system 100 can capture a continuous stream of preview frames while the camera is in preview mode. In preview mode, a display screen of a device implementing the dynamic frame skip system 100 can display a representation of the target image scene, for example with any automatically-determined or user-selected capture and/or post-processing settings applied. Such preview frames may be a lower resolution than a final, captured image in some implementations. Other embodiments may capture preview frames for a predetermined time after initiation of an image capture mode. The frames 110 can be such above-described preview frames in some implementations. In other implementations the frames 110 can comprise a video feed.

The RGB gain computation module 124 of the AWB module 120 computes RGB gain between successive frames. In some embodiments, an RGB gain value associated with a pair of frames can be a value representing a maximum change in the R,G,B gains of the corresponding pixels of the frames. An RGB gain value associated with a pair of frames can be a sum or an average of the R,G,B gains of the pixels of the frames. The RGB gain can be stored as a percentage change, difference value, or ratio. AWB module 120 also includes an AWB calculations module 122 that can be configured to apply a determined frame skip value in selecting frames from the sensor on which to perform AWB calculations.

The RGB gains are fed from the RGB gain computation module 124 into the RGB gain change repository in the dynamic skip module 130. A history of RGB gain delta values can be maintained inside the dynamic frame skip module as part of the RGB gain change repository 131, for example for a pre-set window of frames. In some implementations, ten most recent RGB gain values can be stored in the data repository for use in calculating frame skip values. Other implementations can use greater or fewer RGB gain values, for example in one implementation only a most recent RGB gain value may be used. The RGB gain values are then accessed by the find max change module 132. The find max change module 132 can determine, in one example, whether the max RGB gain change value for the current frame or an average of the values in the RGB gain change data repository is larger. In another example the find max change module 132 can identify a largest RGB gain value among the values output by the RGB gain change repository 131.

The largest value can be output from the find max change module 132 to the threshold comparison module 133 for comparison with one or more thresholds to determine how to change the frame skip settings, if at all. The threshold comparison module 133 can receive the threshold data from the threshold(s) data repository 135. Threshold data can include one or more thresholds, where each threshold is associated with a frame skip value. Accordingly, the threshold comparison module 133 can perform a comparison between the largest RGB gain value and the threshold(s) to determine an appropriate frame skip value.

The frame skip value set module 134 sets a frame skip value based on the output of the threshold comparison module. In some examples the threshold comparison module 133 can output a frame skip value. In other examples, the threshold comparison module 133 can output a result of comparing the largest RGB gain value and the threshold(s), and the frame skip value set module 134 can identify a corresponding frame skip value by accessing a database wherein threshold comparison results are each associated with a frame skip setting. In one example, the largest value is possibly compared to two thresholds by threshold comparison module 133, each threshold associated with one of a low frame skip setting and a high frame skip setting. If the largest value is less than a high skip threshold, then the AWB calculations can be configured to be performed at a high frame skip. If the largest value is greater than the high skip threshold, the largest value can then be compared to a low skip threshold. If the largest value is less than the low skip threshold, then the AWB calculations can be configured to be performed at a low frame skip. If the largest value is greater than the low skip threshold, then the AWB calculations can be configured to perform no frame skipping or minimal frame skipping.

The frame skip value can be output to the AWB calculations module 122 for use in performing AWB calculations on subsequently captured image frames according to the determined frame skip value. The frame skip value can also be sent to the RGB gain computation module 124 in embodiments which do not compute RGB gains for all successive frames. Accordingly, computing resources used by AWB calculations can be dynamically reduced based on RGB gains.

The described modules can be implemented in various embodiments as software instructions executed by one or more hardware processors or as dedicated logic circuitry.

Figure 1B:
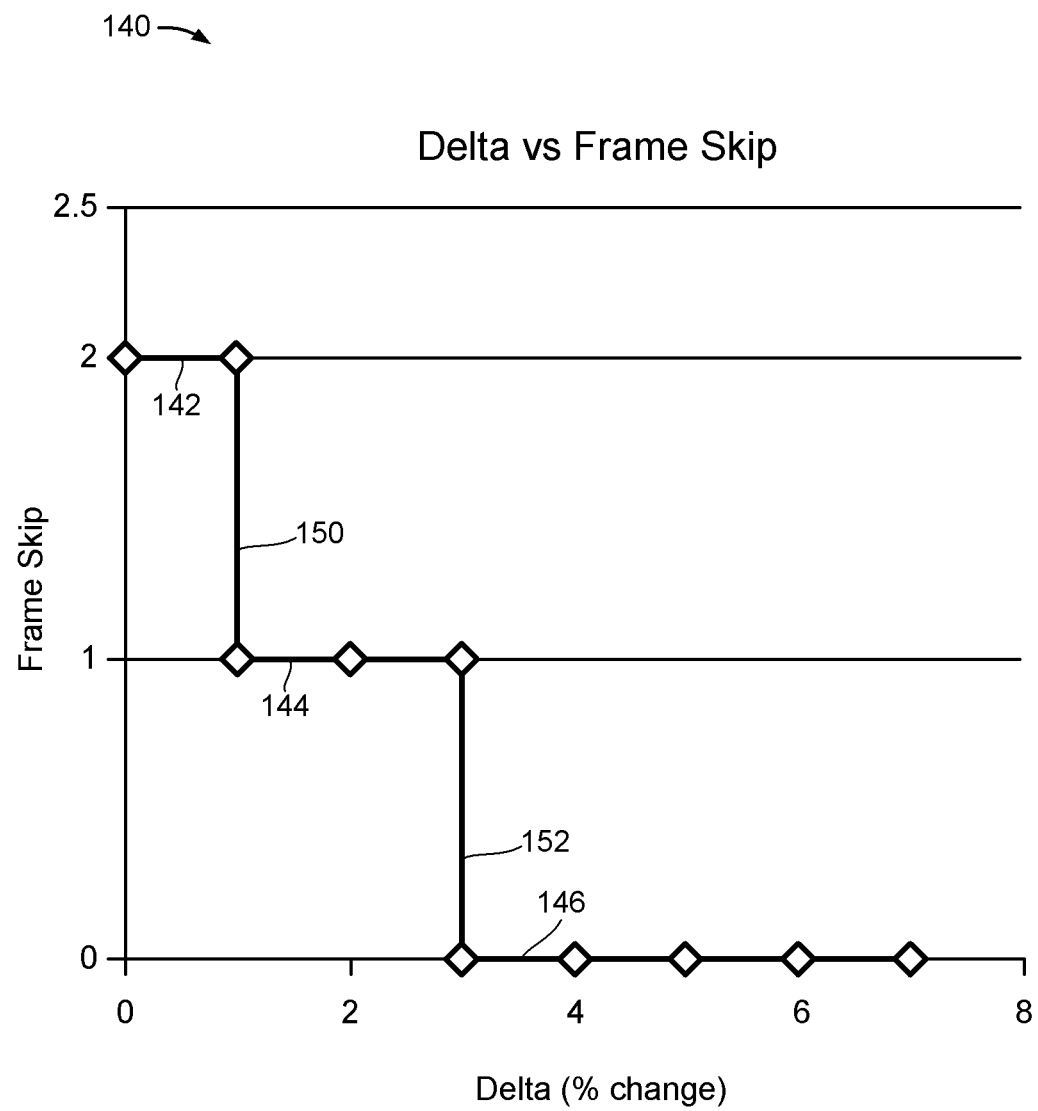
FIG. 1B provides an illustrative example of one embodiment of frame skipping thresholds.

FIG. 1B provides an illustrative example 140 of one embodiment of frame skipping thresholds expressed as a percentage RGB change (shown along the x-axis) and frame skip values (shown along the y-axis). In the illustrated embodiment, the high skip threshold 142 corresponds to a 1% RGB gain change and the low skip threshold 152 corresponds to a 3% RGB gain change. The high skip threshold 142 is associated with a high frame skip value 142 of two, and the low skip threshold is associated with a low frame skip value 144 of one. RGB gain changes above the low skip threshold 152 are associated with a minimal frame skip value 146 of zero. Accordingly, AWB would skip two frames when the RGB gain value is between zero and one percent, AWB would skip one frame when the RGB gain value is between one and three percent, and AWB would not skip any frames when the RGB gain value is above three percent. These values are configurable and can be varied in other implementations to reflect a trade-off between reductions in possible degradation of image quality and processor usage and associated power consumption. Further, the number of thresholds can vary in other embodiments, for example only using a single threshold or using three or more thresholds.

Overview of Example Image Capture Device

Figure 2A:
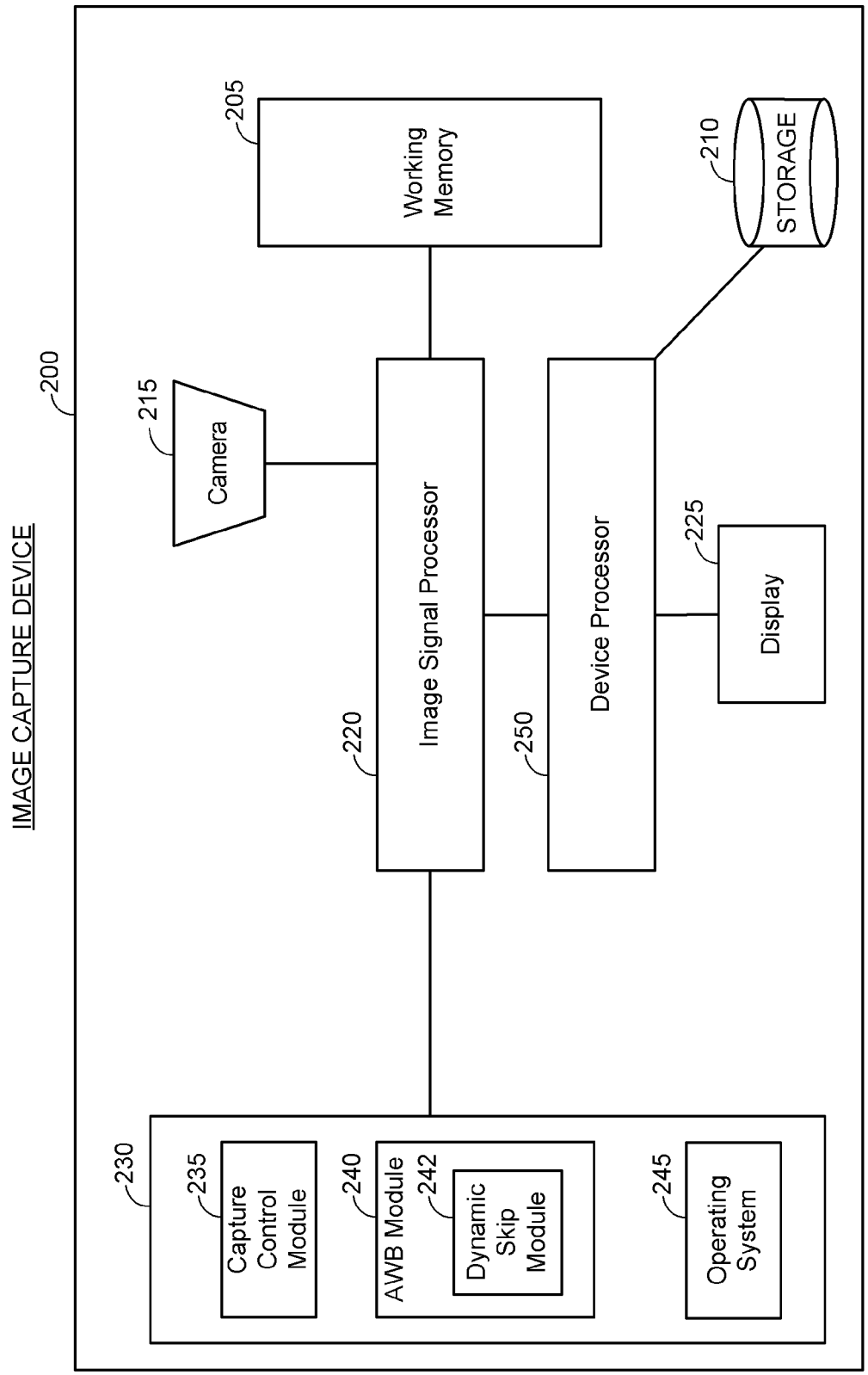
FIG. 2A illustrates a high-level schematic diagram of an embodiment of an image capture device with dynamic frame skip capabilities.

FIG. 2A illustrates a high-level schematic diagram of an embodiment of an image capture device 200 with dynamic frame skipping capabilities, the device 200 having a set of components including an image processor 220 linked to a camera 215. The image processor 220 is also in communication with a working memory 205, memory 230, and device processor 250, which in turn is in communication with storage 210 and an optional electronic display 225.

Device 200 may be a portable personal computing device, e.g. a mobile phone, digital camera, tablet computer, personal digital assistant, or the like. There are many portable computing devices in which using the frame skipping capabilities techniques as described herein would provide advantages. Device 200 may also be a stationary computing device or any device in which the frame skipping techniques would be advantageous. A plurality of applications may be available to the user on device 200. These applications may include traditional photographic and video applications as well as applications relating to dynamic frame skip configuration.

The image capture device 200 includes camera 215 for capturing external images. The camera 215 can include an image sensor, color filter array, and associated lens assembly. The image sensor can include an array of photosensitive elements for converting incident light into electric signals. Such image sensors may include, in certain embodiments, a charge-coupled device (CCD), complementary metal oxide semiconductor sensor (CMOS), or any other image sensing device that receives light and generates image data in response to the received light. The sensor may be provided with an overlying color filter array, for example the RGGB Bayer color filter, so that image data captured by the sensor includes a number of color channels corresponding to the wavelength pass ranges of the color filter array. The present disclosure is described primarily in the context of RGB gains, as RGB image data is produced by sensors having the conventional Bayer pattern. However, the disclosed frame skip techniques can be modified to operate on image data in other color spaces as produced by the color filter array of the camera 215. Such other color spaces can include the RGBN, YCbCr, YUV, and YIQ color spaces, to name a few examples, and the color filter array can include a mosaic of band-pass color filters corresponding to the channels of these color spaces. The image sensor may be able to obtain image data of still photographs and may also provide information regarding motion in a captured video stream. Camera 215 may include one individual sensor or may include arrays of sensors. The camera 215 can be configured for continuous or intermittent capture of preview frames and pre-flash image capture, as well as capture of full resolution final images.

The image processor 220 may be configured to perform various processing operations on received statistics frames (which can be displayed as preview frames) in order to execute dynamic frame skipping. Processor 220 may be a general purpose processing unit or a processor specially designed for imaging applications. Examples of image processing operations include AWB and AEC data generation, auto focus, cropping, scaling (e.g., to a different resolution), image stitching, image format conversion, color interpolation, color processing, image filtering (e.g., spatial image filtering), lens artifact or defect correction, etc. Processor 220 may, in some embodiments, comprise a plurality of processors. Processor 220 may be one or more dedicated image signal processors (ISPs) or a software implementation of a processor.

As shown, the image processor 220 is connected to a memory 230 and a working memory 205. In the illustrated embodiment, the memory 230 stores capture control module 235, AWB module 240 including dynamic skip module 242, and operating system 245. The modules of the memory 230 include instructions that configure the image processor 220 of device processor 250 to perform various image capture, image processing, and device management tasks. Working memory 205 may be used by image processor 220 to store a working set of processor instructions contained in the modules of memory 230. Alternatively, working memory 205 may also be used by image processor 220 to store dynamic data created during the operation of device 200.

AWB 240 can perform AWB calculations on statistics frames, and can also store sub-module dynamic skip module 242. AWB module 240 can comprise AWB module 120 and dynamic skip module 130 in some embodiments. Together, these modules can cooperate to perform the dynamic frame skipping calculations and associated AWB techniques.

Dynamic skip module 242 can include the sub-modules described above in FIG. 1A with respect to dynamic skip module 130, and can be configured to store instructions that configure the processor 220 to analyze a number of preliminary images, for example a statistics frame, to identify the RGB gains between successive frames. As described above, the RGB gains can be used to determine a number of frames to skip for AWB calculations to reduce processor usage and associated power consumption.

As mentioned above, the image processor 220 is configured by several modules stored in the memories. The capture control module 235 may include instructions that configure the image processor 220 to adjust the focus position of camera 215. Capture control module 235 may further include instructions that control the overall image capture functions of the device 200. For example, capture control module 235 may include instructions that call subroutines to configure the image processor 220 to capture preview image data including one or more frames of a target image scene using the camera 215. In one embodiment, capture control module 235 may then call the AWB module 240 to perform frame skip calculations and AWB calculations.

Operating system module 245 configures the image processor 220 to manage the working memory 205 and the processing resources of device 200. For example, operating system module 245 may include device drivers to manage hardware resources for example the camera 215. Therefore, in some embodiments, instructions contained in the image processing modules discussed above may not interact with these hardware resources directly, but instead interact through standard subroutines or APIs located in operating system component 245. Instructions within operating system 245 may then interact directly with these hardware components. Operating system module 245 may further configure the image processor 220 to share information with device processor 250.

Device processor 250 may be configured to control the display 225 to display the captured image, or a preview of the captured image, to a user. The display 225 may be external to the imaging device 200 or may be part of the imaging device 200. The display 225 may also be configured to provide a view finder displaying a preview image for a use prior to capturing an image, for example present the user with a visual representation of the image with AWB corrected color cast or with a user interface for adjusting frame skip parameters. The display 225 may comprise an LCD or LED screen, and may implement touch sensitive technologies.

Device processor 250 may write data to storage module 210, for example data representing captured images and RGB gains. While storage module 210 is represented graphically as a traditional disk device, those with skill in the art would understand that the storage module 210 may be configured as any storage media device. For example, the storage module 210 may include a disk drive, e.g. a floppy disk drive, hard disk drive, optical disk drive or magneto-optical disk drive, or a solid state memory e.g. a FLASH memory, RAM, ROM, and/or EEPROM. The storage module 210 can also include multiple memory units, and any one of the memory units may be configured to be within the image capture device 200, or may be external to the image capture device 200. For example, the storage module 210 may include a ROM memory containing system program instructions stored within the image capture device 200. The storage module 210 may also include memory cards or high speed memories configured to store captured images which may be removable from the camera. The storage module 210 can also be external to device 200, and in one example device 200 may wirelessly transmit data to the storage module 210, for example over a network connection.

Although FIG. 2 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components, for example to save cost and/or to improve performance.

Additionally, although FIG. 2 illustrates two memory components, including memory component 220 comprising several modules and a separate memory 205 comprising a working memory, one with skill in the art would recognize several embodiments utilizing different memory architectures. For example, a design may utilize ROM or static RAM memory for the storage of processor instructions implementing the modules contained in memory 230. The processor instructions may be loaded into RAM to facilitate execution by the image processor 220. For example, working memory 205 may comprise RAM memory, with instructions loaded into working memory 205 before execution by the processor 220.

Figure 2B:
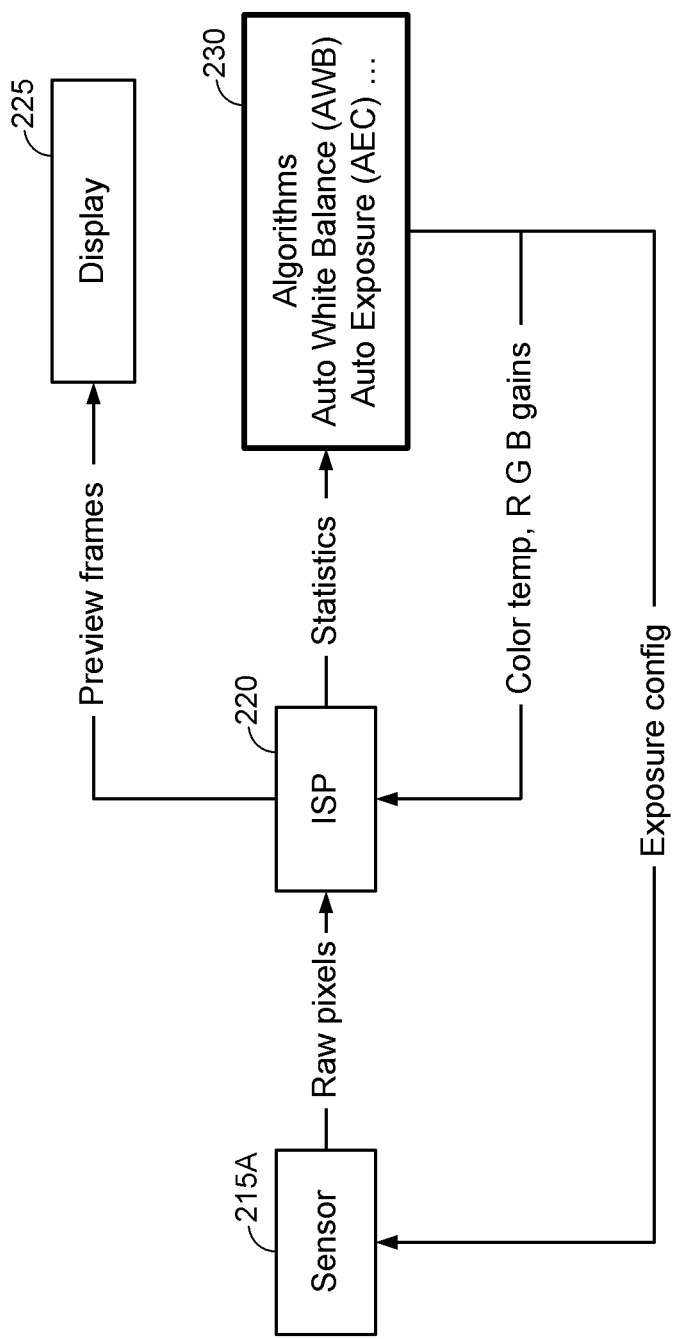
FIG. 2B illustrates example data communications between some of the components illustrated in FIG. 2A.

FIG. 2B illustrates example data communications between some of the components illustrated in FIG. 2A. For instance, sensor 215A of camera 215 can send data representing pixel values to the ISP 220. The ISP 220 can use the pixel values to generate and send preview frames to a display 225. For example, the preview frames can include image data with AWB corrections. The ISP 220 can also send statistics to image processing modules stored in the working memory 230, for example containing instructions for performing AWB (module 240), auto exposure, and the like. These various modules can use the statistics to generate and send color temperature and RGB gains back to the ISP for generation of preview frames from the pixel values, or to generate and send exposure configurations back to the sensor 215A. In other examples the sensor 215A can send the frames directly to AWB module 240 and statistics can be calculated by the AWB module 240. Other image capture parameters can be output back to sensor 215A, for example autofocus configurations.

Overview of Dynamic Frame Skip Techniques

Figure 3:
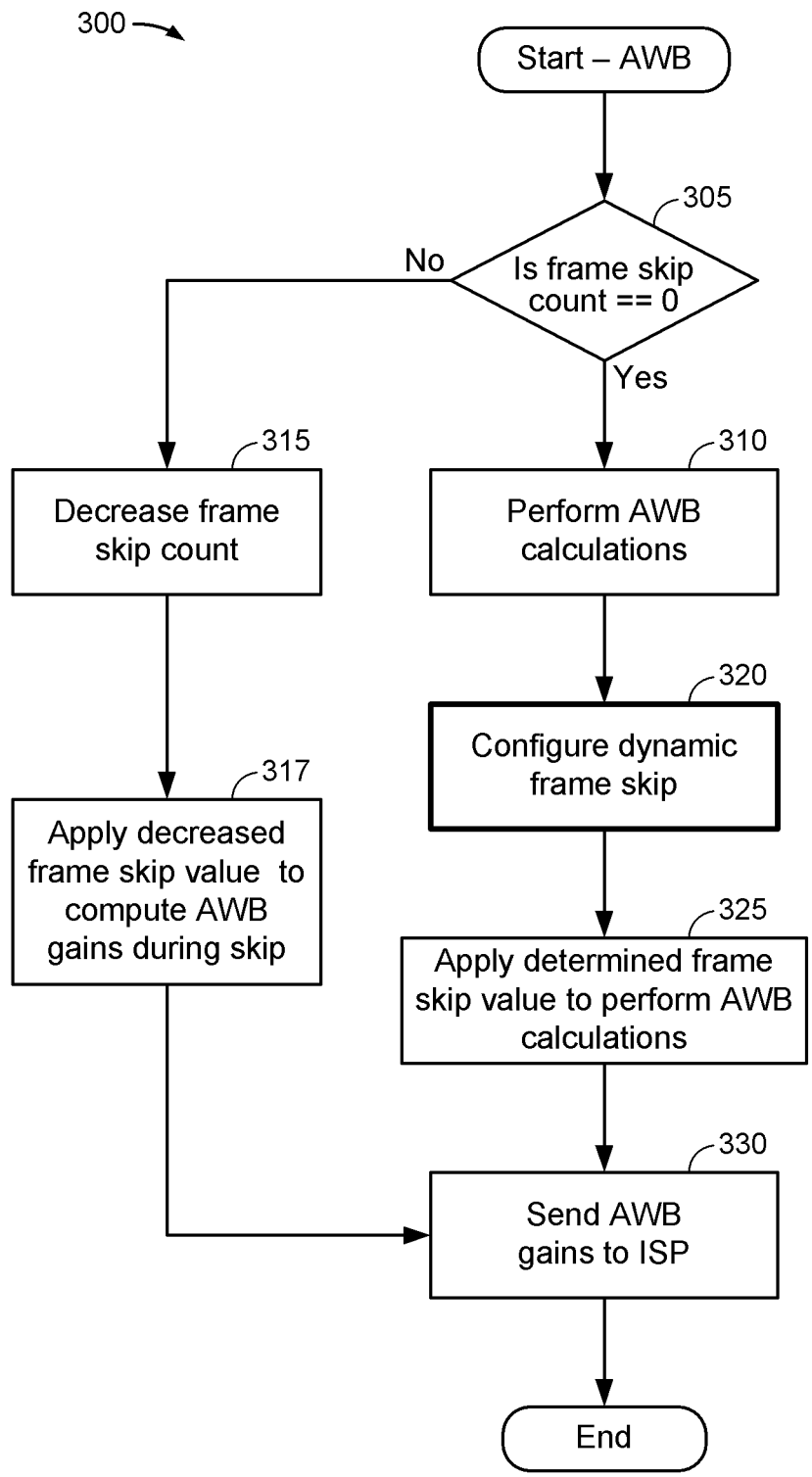
FIG. 3 illustrates a flowchart of an embodiment of an automatic white balance process implementing the dynamic frame skipping techniques described herein.

FIG. 3 illustrates a flowchart of an embodiment of an automatic white balance process 300 implementing the dynamic frame skipping techniques described herein. Process 300 can be carried out by AWB module 240 in some implementations.

To begin, AWB is initialized. At block 305, the AWB module 240 determines whether the frame skip count is set to zero or a minimal frame skip value. If the frame skip count is not set to zero, at block 315 the AWB module 240 decreases the frame skip count, for example to the minimal frame skip value. At block 317 the AWB module 240 applies the decreased frame skip value to subsequently captured image frames to perform AWB calculations and determine AWB gains at the decreased frame skip value. At block 330, these AWB gains are sent to the ISP.

If the frame skip count is set to zero, at block 325, the AWB module 240 runs the temporal filter (that is, applies the determined frame skip value to perform AWB calculations) on captured image frames and applies gain adjustments based on the AWB calculations to the image frames. At block 330 the AWB module sends the AWB gains to the ISP and ends the process 300. In other embodiments the process 300 loops back to block 310 to re-determine the frame skip value.

If the frame skip count is set to zero, at block 310 the AWB module 240 runs AWB to screen the statistics and run heuristics on captured image frames. At block 320 the AWB model configures dynamic frame skip by determining a frame skip value based on RGB gain values generated by the AWB module 124, 240, runs the temporal filter and applies gain adjustments, sends AWB gains to the ISP, and ends the process.

Figure 4:
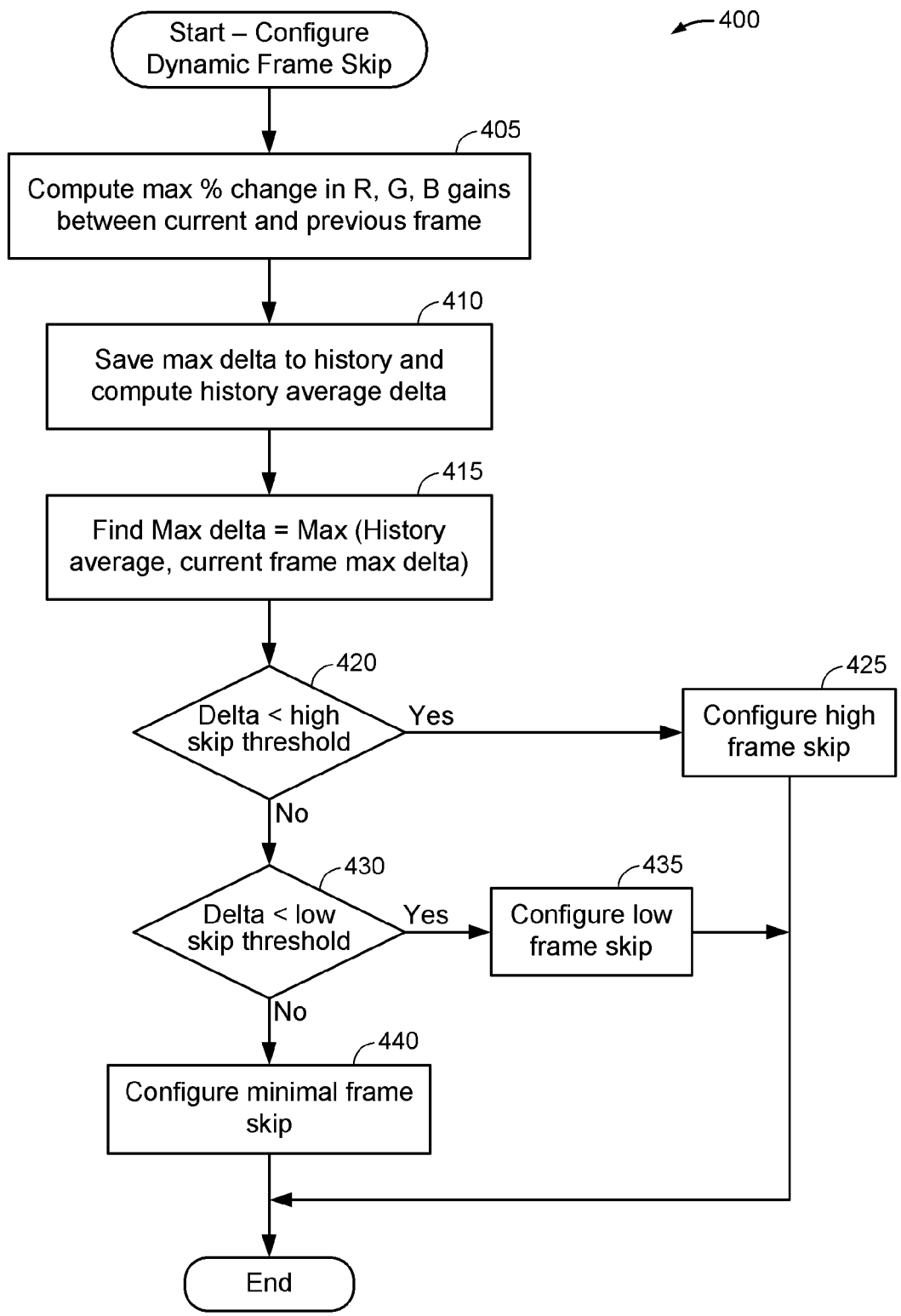
FIG. 4 illustrates a flowchart of an embodiment of a dynamic frame skipping process.

FIG. 4 illustrates a flowchart of an embodiment of a dynamic frame skipping process 400 that can be used in some implementations as block 320 of the automatic white balance process 300 of FIG. 3. Process 400 can be carried out by dynamic skip module 242 in some examples.

To begin, dynamic frame skip configuration is initialized. At block 405, dynamic frame skip module 242 computes the maximum change of R, G, B gains ("max delta") between a current frame and a previous frame. This can be computed, in one example, as a maximum percentage change by calculating percentage changes between R, G, and B values of pixels from first and second image frames at corresponding pixel locations and by comparing the percentage changes from each pixel location to identify a largest percentage change. In another example, the maximum change can be computed as a maximum difference value by subtracting R, G, and B values of each pixel from the R, G, and B values of a corresponding pixel location in a different image frame, comparing the difference values, and identifying a largest difference value. Some embodiments may separately compare data from the R, G, and B channels to identify a largest gain of all channels. This largest gain is referred to herein as the "maximum delta." Some embodiments may consider R, G, and B gains together, for example by summing or averaging the R, G, and B values a at a pixel location. Some embodiments may use only one or two channels of R, G, and B values for calculating the RGB gains. It will be understood that the process 400 can be adapted to operate using channel gains in images in other color spaces, including the RGBN, YCbCr, YUV, and YIQ color spaces, to name a few examples.

At block 410 dynamic frame skip module 242 can save the maximum delta to a history and calculate a history average delta. At block 415, dynamic frame skip module 242 can find the max delta in the history, for example by max delta=max (history average, current frame max delta).

Dynamic frame skip module 242 can compare the max delta in the history to one or more thresholds. For example, in the illustrated embodiment, at block 420 dynamic frame skip module 242 can compare the max delta to a high skip threshold. If the max delta is less than the high skip threshold, then the process 400 transitions to block 425 and the dynamic frame skip module 242 can output data indicating that AWB calculations are to be performed at a high frame skip. If the max delta is greater than the high skip threshold, then the process 400 transitions to block 430 and the dynamic frame skip module 242 can compare the max delta to a low skip threshold. If the max delta is less than the low skip threshold, then the process 400 transitions to block 435 and the dynamic frame skip module 242 can output data indicating that AWB calculations are to be performed at a low frame skip. If the max delta is greater than the low skip threshold, then the process 400 transitions to block 440 dynamic frame skip module 242 can output data indicating that AWB calculations are to be performed with no frame skipping. Accordingly, color channel gains can be used to dynamically vary the rate of performing AWB calculations, conserving computing resources with minimal or no sacrifices for image quality.

Overview of Example Use Cases

Figure 5A:
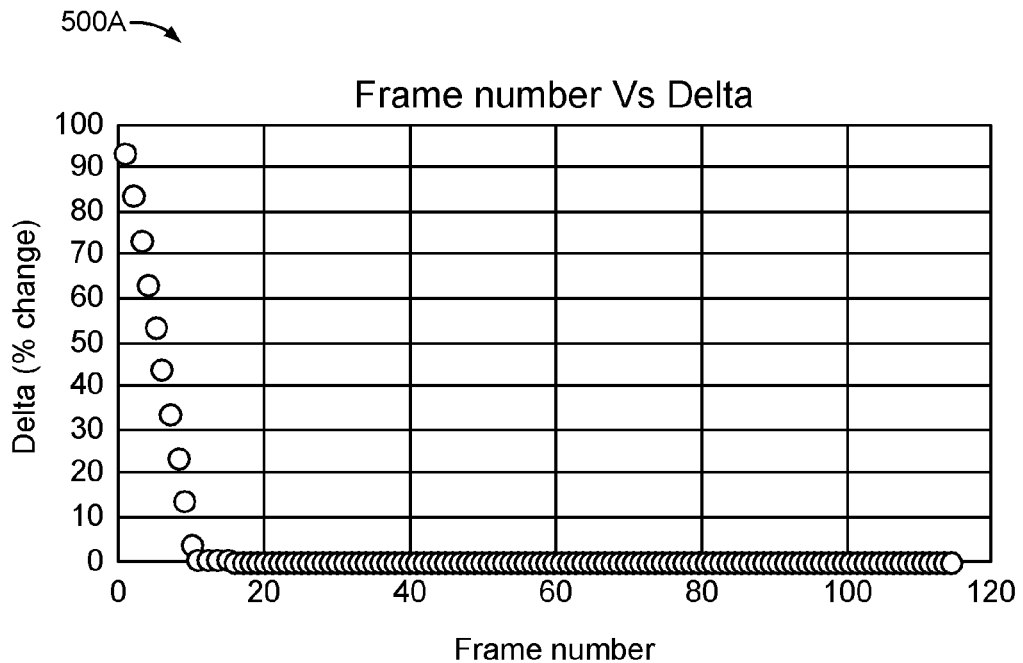
FIGS. 5A and 5B illustrate an example camera launch use case of the dynamic frame skipping techniques described herein.
Figure 5B:
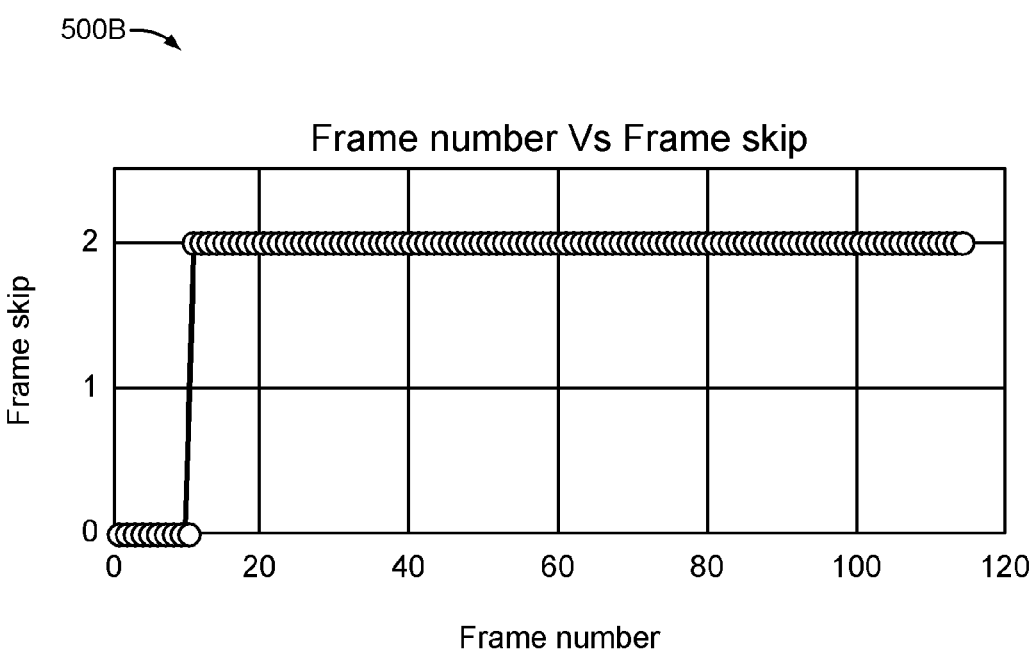

FIGS. 5A and 5B illustrate an example camera launch use case of the dynamic frame skipping techniques described herein.

FIG. 5A illustrates a plot representation 500A of frame number versus RGB gain changes ("delta") upon camera launch, where delta represents a maximum percentage gain change between image frames. As illustrated, delta decreases after launch and, after around 10 frames, AWB is stable.

FIG. 5B illustrates a plot representation 500B of frame number versus frame skip value for the frames illustrated in FIG. 5A. As illustrated, once AWB stabilizes as shown in FIG. 5A, the frame skip is set at a constant max value.

Figure 6A:
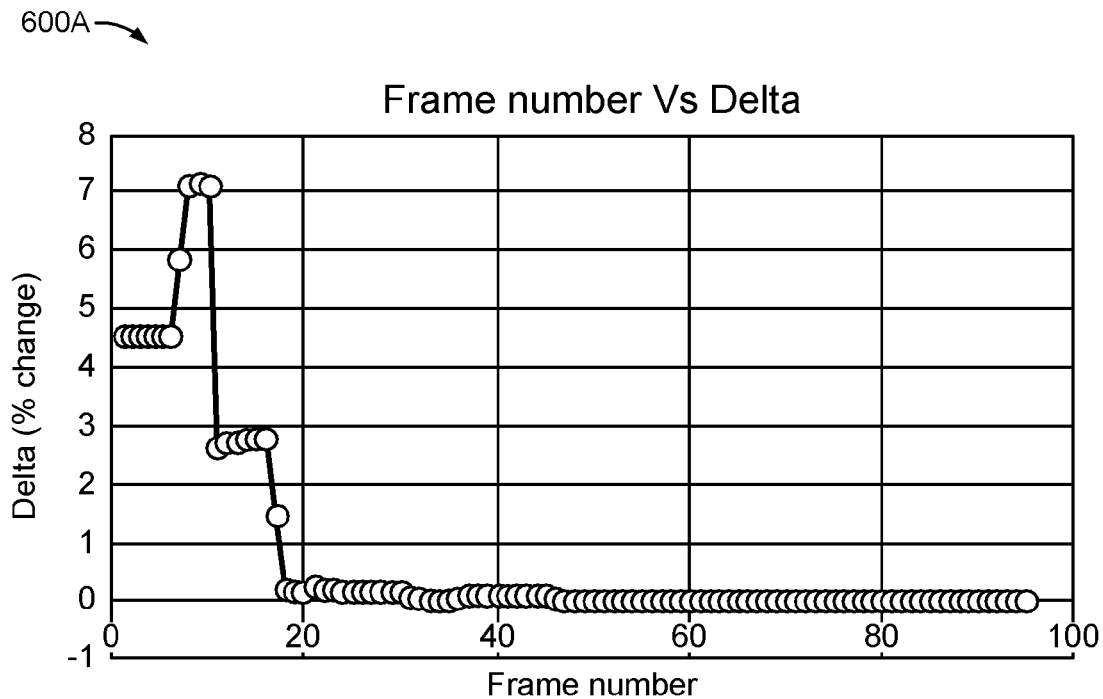
FIGS. 6A and 6B illustrate an example camera scene change use case of the dynamic frame skipping techniques described herein.
Figure 6B:
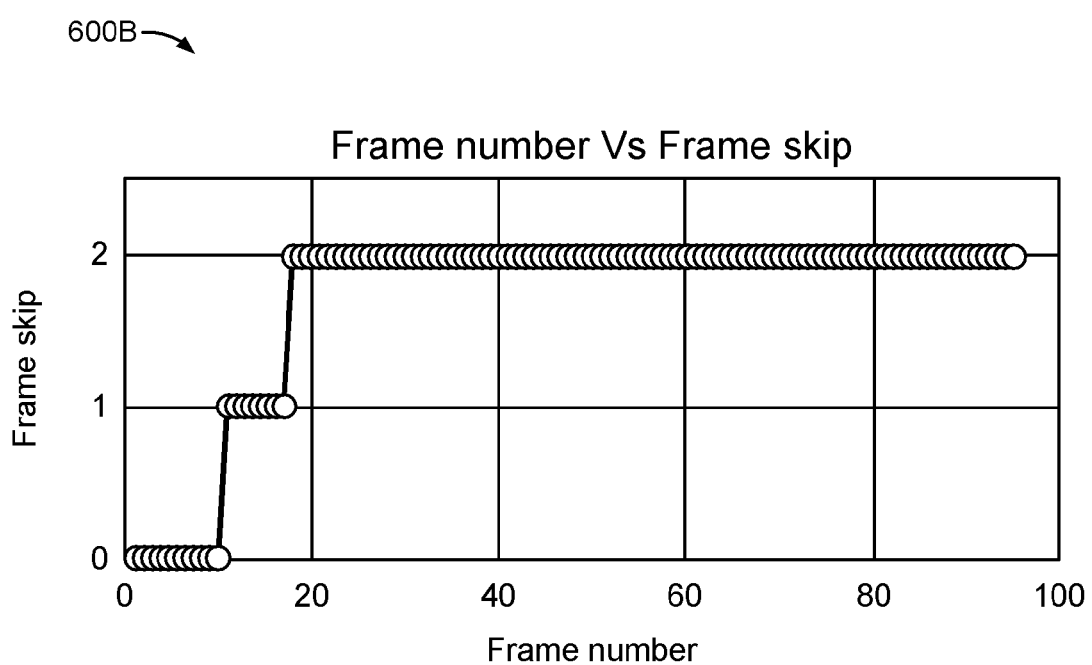

FIGS. 6A and 6B illustrate an example camera scene change use case of the dynamic frame skipping techniques described herein.

FIG. 6A illustrates a plot representation 600A of frame number versus delta upon camera scene change that includes a lighting change. As illustrated, delta decreases nonlinearly after scene change and, after around 20 frames, AWB is stable. The depicted delta values are for purposes of example and actual delta values over a set of frames during camera scene change can vary according to the nature of the scene and the nature of the change.

FIG. 6B illustrates an example plot representation 600B of frame number versus frame skip value for the frames illustrated in FIG. 6A. As illustrated, when AWB temporarily stabilizes around ten frames in FIG. 6A, frame skip is set at an intermediate value. Once AWB stabilizes as shown in FIG. 6A, the frame skip is set at a constant max value. Accordingly, computing resource savings can still be achieved at a more moderate rate while the scene temporarily achieves stabilization during scene change, and after scene change AWB calculations are performed using maximum frame skip to achieve more significant power savings.

Overview of Additional Example Dynamic Frame Skipping in AWB

Figure 7:
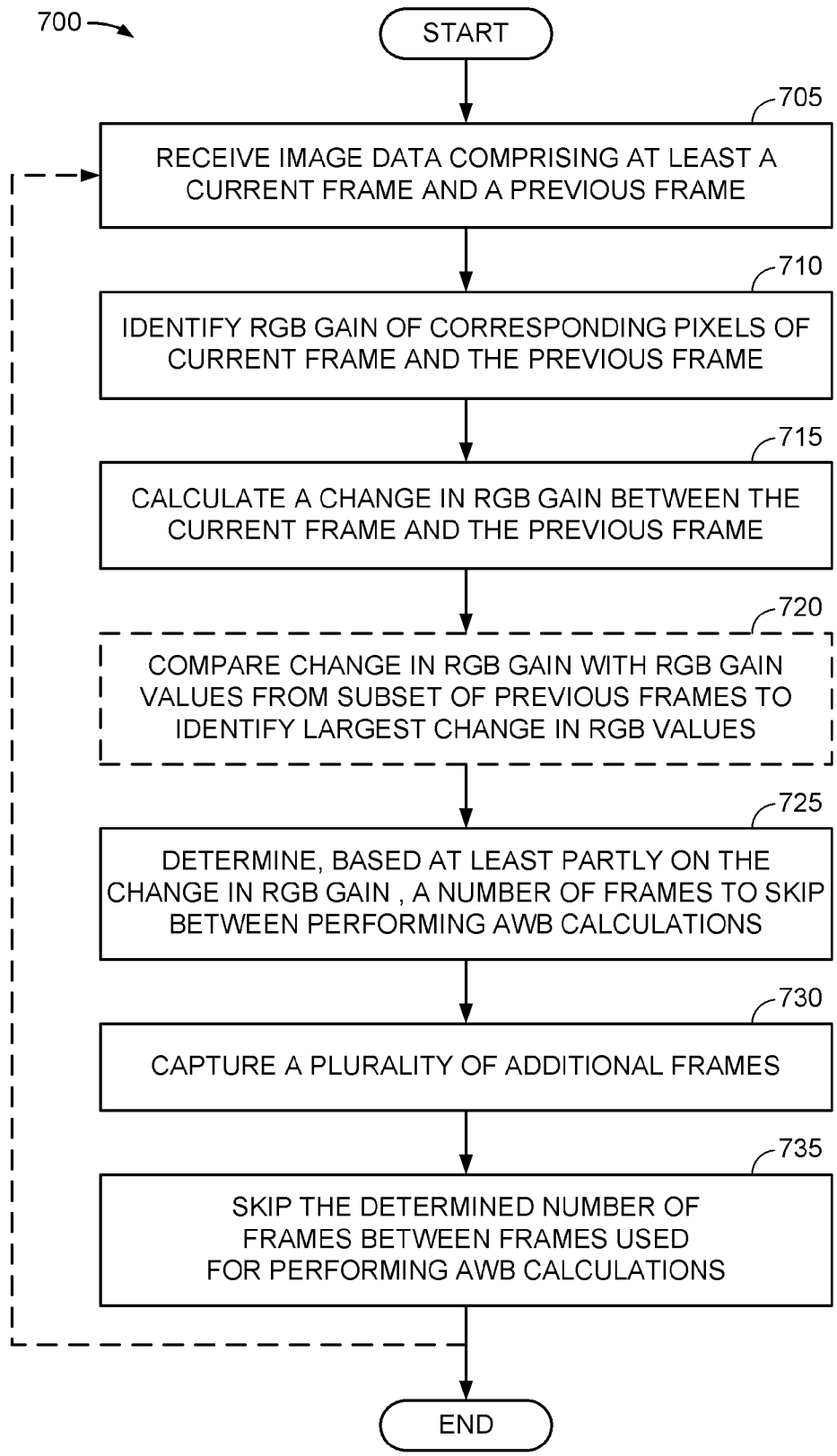
FIG. 7 illustrates a flowchart of an embodiment of a dynamic frame skipping process.

FIG. 7 illustrates a flowchart of an embodiment of an automatic white balance process 700 implementing the dynamic frame skipping techniques described herein. Process 700 can be carried out by the components of FIGS. 1A and/or 2A-2B in some implementations.

At block 705, the AWB module 120 can receive image data comprising at least a current frame and a previous frame. In some embodiments the frames can be successive, and in other embodiments the frames can be spaced apart by a number of intermediate frames. Each frame can comprise a number of pixels, each pixel having associated R, G, and B values interpolated for example via demosaicking.

At block 710 the AWB module 120 can identify RGB gains of corresponding pixels of the current frame and the previous frame. For example, the AWB module can identify first RGB gains of a first pixel in the current frame and second RGB gains of a second pixel in the previous frame, where signals representing the first and second pixels were generated by the same sensing element of the image sensor at different times. Though discussed in the context of RGB gains, the process 700 can be modified to operate on a single color channel or two color channels of the RGB image data in some embodiments. In other embodiments, the process 700 can be modified operate on one or more channels of image data in other color spaces including the RGBN, YCbCr, YUV, and YIQ color spaces, to name a few examples. Accordingly, the channel values used for process 700 can be a gain value or a different kind of pixel value, for example a color or luminance value.

At block 715, the AWB module 120 can calculate a change in RGB gains between corresponding pixels of the current frame and the previous frame. The change in RGB gains can be a percentage, difference, ratio, sum, or average value representing a change in the RGB gains of the corresponding pixels of the frames. In some embodiments, the change can represent a maximum change in the RGB gains between the current frame and the previous frame.

Optionally, at block 720, the dynamic skip module 130 can compare the maximum change in the RGB gains with similar values determined from a group of previous frames in order to identify a largest change in RGB values. For example, the values from the previous frames can be averaged, and the dynamic skip module can determine whether the maximum change in the RGB gain is greater than the average. If the maximum change in the RGB gain is greater than the average, then the maximum change in the RGB gain can be output for use in identifying a frame skip value. If the maximum change in the RGB gain is greater than the average then the dynamic skip module 130 can output the maximum change in the RGB gain from the current and previous frame. If the maximum change in the RGB gains is not greater than the average then the dynamic skip module 130 can output the average value.

At block 725 the dynamic skip module 130 can determine, based on the output RGB change value, a number of frames to skip between performing AWB calculations. For example, as described herein the output RGB change value can be compared to one or more thresholds to identify a corresponding number of frames to skip between performing AWB calculations. Generally, comparison of smaller RGB change values with the determined thresholds should yield larger frame skip values, as the smaller RGB change values indicate less change in the image scene and thus more stabilization. Accordingly, AWB calculations performed for one frame may be sufficient to use for a number of subsequent frames of a stabilized image scene without the need to recalculate the AWB calculations specifically for each frame. When RGB change values increase, AWB calculations can be performed more frequently to account for scene changes.

At block 730, the camera 215 captures a plurality of additional image frames. Blocks 705-725 can be repeated for some or all pairs of successive frames in the additional image frames.

At block 735, the AWB calculations module 122 can skip the determined number of frames between frames between frames used for performing AWB calculations. As additional image frames are captured and new frame skip numbers are identified the AWB calculations module 122 can be updated accordingly.

Implementing Systems and Terminology

Implementations disclosed herein provide systems, methods and apparatus for dynamic frame skip configuration. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, one or more image signal processors, and a memory including instructions or modules for carrying out the dynamic frame skip process discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The functions or process blocks described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like. The phrase "based on" does not mean "based only on," unless expressly specified otherwise. In other words, the phrase "based on" describes both "based only on" and "based at least on."

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. An image capture system comprising:
    an image sensor having an array of photosensitive elements each located at one of a plurality of locations on the image sensor; and
    at least one processor configured to:
        receive image data having red, green and blue channels, the image data representing at least a current frame and a previous frame, the current frame comprising a first plurality of pixels and the previous frame comprising a second plurality of pixels;
        calculate RGB gain information for each of the red, green and blue channels, and from pixel values corresponding to each of at least a subset of the plurality of locations of the photosensitive elements, based on:
            identifying a first value from one of the first plurality of pixels, and
            identifying a second value from a corresponding one of the second plurality of pixels; and
            calculating a change between the first value and the second value;
        determine, based on the RGB gain information, a maximum change value representing a greatest difference between the first value and the second value for at least one of the subset of the plurality of locations;
        compare the maximum change value with at least one threshold; and
        determine, based at least partly on a result of comparing the maximum change value with the at least one threshold, a number of frames to skip between performing AWB calculations.

2. The system of claim 1, wherein the at least one processor is further configured to compare the maximum change value with at least one threshold based on:
    comparing the maximum change value with a first threshold; and
    in response to determining that the maximum change value is less than or equal to the first threshold, setting the number of frames to skip between performing AWB calculations to a maximum frame skip value.

3. The system of claim 2, wherein the maximum frame skip value is ten frames.

4. The system of claim 2, wherein the first threshold is one percent, and wherein the maximum change value represents a percentage difference between the first value and the second value for the at least one of the subset of the plurality of locations.

5. The system of claim 2, wherein, in response to determining that the maximum change value is greater than the first threshold, the at least one processor is further configured to:
    compare the maximum change value with a second threshold; and
    in response to determining that the maximum change value is less than or equal to the second threshold, set the number of frames to skip between performing AWB calculations to an intermediate frame skip value, wherein the intermediate frame skip value is less than the maximum frame skip value.

6. The system of claim 5, wherein, in response to determining that the maximum change value is greater than the second threshold, the at least one processor is further configured to set the number of frames to skip between performing AWB calculations to a minimum frame skip value, wherein the minimum frame skip value is less than the intermediate frame skip value.

7. The system of claim 5, wherein the second threshold is three percent, and wherein the maximum change value represents a percentage difference between the first value and the second value for the at least one of the subset of the plurality of locations.

8. The system of claim 6, wherein the minimum frame skip value is zero.

9. The system of claim 1, wherein the at least one processor is further configured to:
    receive additional image data representing a plurality of additional frames;
    perform AWB calculations on a first additional frame of the plurality of additional frames;
    skip performing AWB calculations on a subset of the plurality of additional frames, wherein a number of frames in the plurality of additional frames is equal to the determined number of frames; and
    perform AWB calculations on a second additional frame of the plurality of frames, the subset of the plurality of additional frames captured temporally between the first and second additional frames.

10. The system of claim 9, wherein the at least one processor is further configured to calculate an updated number of frames to skip between performing AWB calculations based on at least some of the plurality of additional frames.

11. The system of claim 10, wherein the at least one processor is further configured to perform AWB calculations on an additional plurality of additional frames based on the updated number of frames to skip.

12. The system of claim 1, further comprising a color filter array positioned between the image sensor and incoming light from a target image scene, the color filter array comprising a plurality of band pass filters each corresponding to one of the red, green, and blue channels.

13. A method for dynamically configuring a frame skip value for performing auto white balance, the method comprising:
    receiving, from an image sensor comprising an array of photosensitive elements each located at one of a plurality of locations on the image sensor, image data representing at least a current frame and a previous frame, the current frame comprising a first plurality of pixels and the previous frame comprising a second plurality of pixels;

identifying, for at least one color channel, and from pixel values corresponding to each of at least a subset of the plurality of locations of the photosensitive elements, a first value from one of the first plurality of pixels and a second value from a corresponding one of the second plurality of pixels;

calculating a change value between the first value of the one of the first plurality of pixels from the first frame and the second value of the corresponding one of the second plurality of pixels of the second frame;

comparing the change value with at least one threshold; and determining, based at least partly on a result of comparing the change value with the at least one threshold, a number of frames to skip between performing AWB calculations.

14. The method of claim 13, wherein comparing the change value with at least one threshold comprises:
comparing the change value with a first threshold; and
in response to determining that the change value is less than or equal to the first threshold, setting the number of frames to skip between performing AWB calculations to a maximum frame skip value.

15. The method of claim 14, further comprising, in response to determining that the change value is greater than the first threshold:
comparing the change value with a second threshold; and
in response to determining that the change value is less than or equal to the second threshold, setting the number of frames to skip between performing AWB calculations to an intermediate frame skip value, wherein the intermediate frame skip value is less than the maximum frame skip value.

16. The method of claim 15, further comprising, in response to determining that the change value is greater than the second threshold, setting the number of frames to skip between performing AWB calculations to a minimum frame skip value, wherein the minimum frame skip value is less than the intermediate frame skip value.

17. The method of claim 13, wherein calculating the change value comprises computing a maximum change of R, G, and B gains between the current frame and the previous frame.

18. The method of claim 17, wherein calculating the change value comprises comparing the maximum change of R, G, and B gains to a history average of R, G, and B gains between pairs of a plurality of previous frames.

19. The method of claim 18, further comprising:
in response to determining that the maximum change of R, G, and B gains is greater than the history average of R, G, and B gains, outputting the maximum change of R, G, and B gains as the change value; and
in response to determining that the maximum change of R, G, and B gains is less than the history average of R, G, and B gains, outputting the history average of R, G, and B gains as the change value.

20. The method of claim 13, further comprising:
receiving additional image data representing a plurality of additional frames;
performing AWB calculations on a first additional frame of the plurality of additional frames;
skipping performing AWB calculations on a subset of the plurality of additional frames, wherein a number of frames in the plurality of additional frames is equal to the determined number of frames; and
performing AWB calculations on a second additional frame of the plurality of frames, the subset of the plurality of additional frames captured temporally between the first and second additional frames.

21. A non-transitory computer-readable medium having stored thereon instructions that, when executed, cause at least one processor of a device to:
receive image data representing at least a current frame and a previous frame, the current frame comprising a first plurality of pixels and the previous frame comprising a second plurality of pixels, each of the first and second plurality of pixels having a value associated with at least one channel;
calculate, based on the value of at least a subset of the first plurality of pixels and a corresponding subset of the second plurality of pixels, a gain value associated with the at least one channel;
compare the gain value with at least one threshold; and
determine, based at least partly on a result of comparing the gain value with the at least one threshold, a number of frames to skip between performing AWB calculations.

22. The non-transitory computer-readable medium of claim 21, further having stored thereon instructions that, when executed, cause the at least one processor to:
compare the gain value with a first threshold; and
in response to determining that the gain value is less than or equal to the first threshold, set the number of frames to skip between performing AWB calculations to a maximum frame skip value.

23. The non-transitory computer-readable medium of claim 22, further having stored thereon instructions that, when executed, cause the at least one processor to, in response to determining that the gain value is greater than the first threshold:
compare the gain value with a second threshold; and
in response to determining that the gain value is less than or equal to the second threshold, set the number of frames to skip between performing AWB calculations to an intermediate frame skip value, wherein the intermediate frame skip value is less than the maximum frame skip value.

24. The non-transitory computer-readable medium of claim 23, further having stored thereon instructions that, when executed, cause the at least one processor to, in response to determining that the gain value is greater than the second threshold, set the number of frames to skip between performing AWB calculations to a minimum frame skip value, wherein the minimum frame skip value is less than the intermediate frame skip value.

25. The non-transitory computer-readable medium of claim 21, wherein calculating the gain value comprises computing a maximum change of R, G, and B gains between the current frame and the previous frame.

26. The non-transitory computer-readable medium of claim 21, further having stored thereon instructions that, when executed, cause the at least one processor to:
receive additional image data representing a plurality of additional frames;
perform AWB calculations on a first additional frame of the plurality of additional frames;
skip performing AWB calculations on a subset of the plurality of additional frames, wherein a number of frames in the plurality of additional frames is equal to the determined number of frames; and perform AWB calculations on a second additional frame of the plurality of frames, the subset of the plurality of additional frames captured temporally between the first and second additional frames.

27. An image capture apparatus comprising:
means for sensing incident light and outputting image data representing the incident light;
means for identifying channel data of a first frame and a second frame of the image data;
means for calculating a channel gain value based on the channel data of the first frame and the second frame;
means for comparing the channel gain value with at least one threshold; and
means for determining, based at least partly on a result of comparing the channel gain value with the at least one threshold, a number of frames to skip between performing AWB calculations.

28. The apparatus of claim 27, wherein the means for determining the number of frames to skip comprises means for setting the number of frames to a high skip value if the channel gain value is less than the at least one threshold and to set the number of frames to a low skip value if the channel gain value is greater than the at least one threshold.

29. The apparatus of claim 27, further comprising means for performing AWB calculations based partly on the determined number of frames.

30. The apparatus of claim 27, further comprising means for color filtering, the color filtering means positioned between the sensing means and a target image scene, the color filter means and sensing means cooperating to produce the channel data.

* * * * *